United States Patent
Mukherji et al.

(10) Patent No.: US 11,863,638 B1
(45) Date of Patent: Jan. 2, 2024

(54) DISPLAYING SUPPLEMENTAL CONTENT IN MESSAGING INTERFACES

(71) Applicant: Meta Platforms, Inc., Menlo Park, CA (US)

(72) Inventors: Rishav Mukherji, San Francisco, CA (US); May Wang, San Francisco, CA (US); Xingling Huang, Fremont, CA (US); Shuwan Huang, Sunnyvale, CA (US); Hannah Walsh, Menlo Park, CA (US); Hao Dong, Newark, CA (US); Tsung-Chuan Chen, Sunnyvale, CA (US); Mohit Rajani, San Francisco, CA (US)

(73) Assignee: Meta Platforms, Inc., Menlo Park, CA (US)

(*) Notice: Subject to any disclaimer, the term of this patent is extended or adjusted under 35 U.S.C. 154(b) by 108 days.

(21) Appl. No.: 16/557,817

(22) Filed: Aug. 30, 2019

(51) Int. Cl.
| | | |
|---|---|---|
| *H04L 67/53* | (2022.01) | |
| *H04L 51/04* | (2022.01) | |
| *G06F 3/0482* | (2013.01) | |
| *H04L 67/02* | (2022.01) | |

(52) U.S. Cl.
CPC ............ *H04L 67/53* (2022.05); *G06F 3/0482* (2013.01); *H04L 51/04* (2013.01); *G06F 2203/04803* (2013.01); *H04L 67/02* (2013.01)

(58) Field of Classification Search
CPC ......... H04L 67/20; H04L 51/04; H04L 67/02; H04L 67/53; G06F 3/0482; G06F 2203/04803
See application file for complete search history.

(56) References Cited

U.S. PATENT DOCUMENTS

| | | | | |
|---|---|---|---|---|
| 9,542,697 | B1* | 1/2017 | Eidelson | G06F 16/9535 |
| 9,967,399 | B2* | 5/2018 | Khalatian | H04L 41/5064 |
| 10,153,995 | B2* | 12/2018 | Krishnamoorthy | H04L 67/02 |
| 10,749,821 | B2* | 8/2020 | Pulugurtha | H04L 51/04 |
| 10,956,474 | B2* | 3/2021 | Pasternack | G06Q 50/01 |
| 2003/0222907 | A1* | 12/2003 | Heikes | H04L 67/36 715/745 |
| 2010/0037153 | A1* | 2/2010 | Rogers | G06Q 10/10 715/758 |
| 2010/0185951 | A1* | 7/2010 | Nichols | H04L 65/4015 715/738 |
| 2016/0218997 | A1* | 7/2016 | Patil | G06F 40/274 |
| 2016/0234141 | A1* | 8/2016 | Kim | H04L 51/046 |

(Continued)

*Primary Examiner* — Kieu D Vu
*Assistant Examiner* — Blaine T Basom
(74) *Attorney, Agent, or Firm* — Fenwick & West LLP

(57) ABSTRACT

An online system displays supplemental content in conjunction with messaging threads between users and third parties to promote clear and productive conversations. The online system enables third parties to specify a set of content items to be displayed within a messaging interface when a messaging thread is initiated with the third party by other users. The set of content items may include one or more of images, videos, or web pages. When a user initiates a messaging thread with a third party, the online system accesses the set of specified content items and generates a messaging interface including one or more of the specified content items. By incorporating the content items within the messaging interface, the online system enables users and third parties to communicate while interacting with and viewing the content items.

8 Claims, 7 Drawing Sheets

(56) References Cited

U.S. PATENT DOCUMENTS

| | | | | |
|---|---|---|---|---|
| 2017/0269800 A1* | 9/2017 | Park | ............ | H04W 4/14 |
| 2018/0239770 A1* | 8/2018 | Ghotbi | ............ | G06F 9/453 |
| 2018/0367484 A1* | 12/2018 | Rodriguez | ............ | H04L 67/36 |
| 2019/0288979 A1* | 9/2019 | Ritchie | ............ | H04L 67/18 |
| 2019/0339820 A1* | 11/2019 | Wu | ............ | G06F 9/451 |
| 2020/0026395 A1* | 1/2020 | Wantland | ............ | G06F 3/0237 |

* cited by examiner

DISPLAYING SUPPLEMENTAL CONTENT IN MESSAGING INTERFACES

BACKGROUND

This disclosure relates generally to electronic messaging, and more particularly to presenting supplemental content in electronic messaging threads.

Exchanging messages via an online system is a common method of online communication. Users use client devices, such as smartphones, to execute the online system in order to exchange messages with other users or entities on the online system. The online system allows users to send and receive text, images, videos, Uniform Resource Locators (URLs), and other forms of content.

One benefit provided by online systems is the ability to interact remotely and directly with entities, such as businesses. However, conversations with entities and other users may be unproductive or unclear when entities and users are unable to access, view, or specify content relevant to a conversation. For example, a user requesting information about a product or service of a business may encounter difficulty in communicating to the business the particular product or service of interest. In another example, an entity sharing information about a product or service may encounter difficulty in relaying relevant information to a user, or may relay redundant information to a user.

SUMMARY

These and other issues are addressed by an online system that provides supplemental content items to users within the messaging interface. Entities of the online system specify a set of content items to be displayed within a messaging interface when a messaging thread is initiated with the entity by other users of the online system. For example, an entity specifies one or more images, videos, or web pages to be displayed within the messaging interface.

When a user of the messaging application initiates a messaging thread with the entity, the online system accesses the set of specified content items and generates a messaging interface including one or more of the specified content items. By incorporating the content items within the messaging interface, the online system enables users and entities to communicate while viewing and interacting with content items relevant to the messaging thread. For example, users are able to view and navigate a web page specified by the entity within the messaging interface while communicating with the entity.

In some embodiments, the online system tracks user consumption of content items without privacy concerns associated with linking one or more external identities or accounts to an identity of the user on the online system. Based on user interactions with content items within the messaging interface, the online system may select or customize supplemental or other content items for the user. For example, the online system generates content items for the user based on interactions of the user with previous content items, such that the generated content items are more likely to be relevant to the user. In another example, the online system requests user permission or a user opt-in to alert entities to content items (e.g., a video or a set of images) with which a user has interacted, such that the entities may provide better or more specific information regarding the content items to the user or may customize content items provided to the user.

In some embodiments, the messaging interface includes one or more suggested messages for users. When users of the messaging application interact with content items within the messaging interface, the interactions may be used by the messaging interface to improve the relevancy and accuracy of the suggested messages. For example, the messaging application may auto-populate or suggest messages based on how the user is navigating the supplemental content, such as suggesting a message that asks about a specific product when the user has navigated to a web page for that product.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
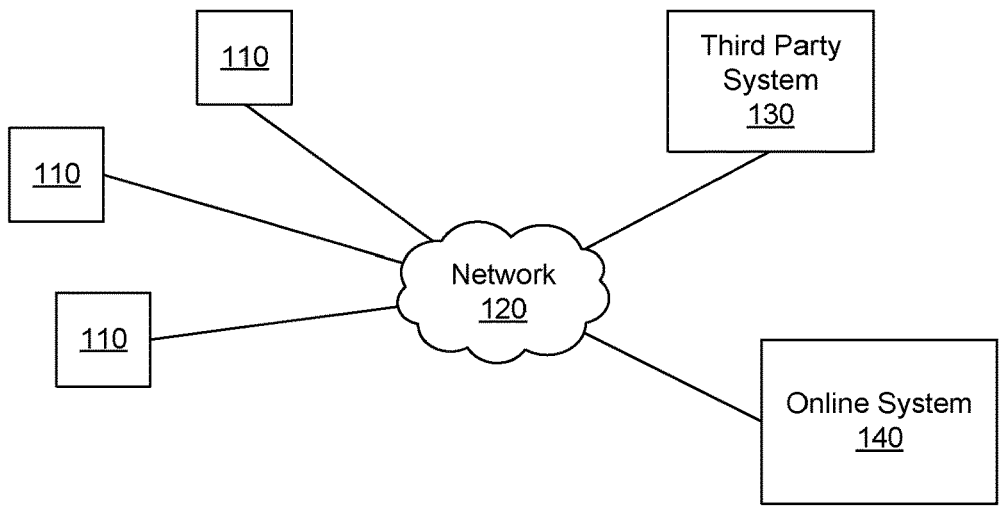
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, a messaging system, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
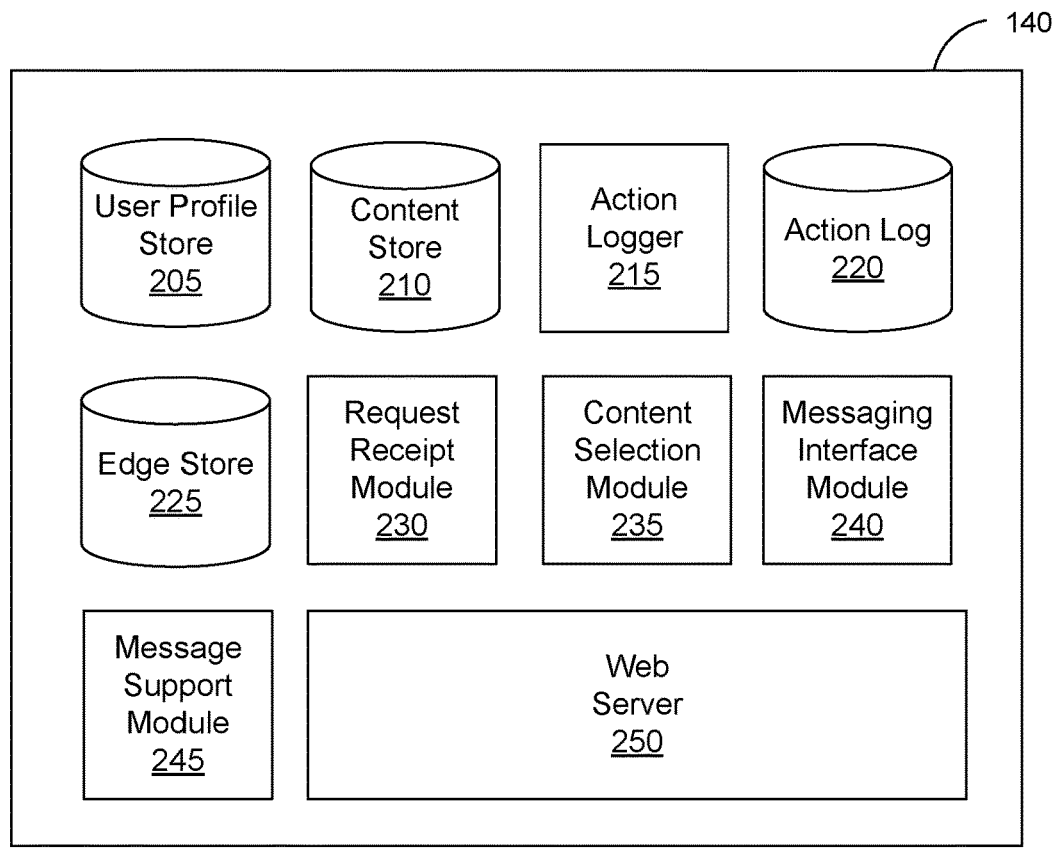
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a request receipt module 230, a content selection module 235, a messaging interface module 240, a message support module 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content specified by third parties 130 for presentation to users of the online system 140 in conjunction with messaging threads with the respective third party. The content is images, videos, web pages, or any other suitable data presented to a user. In some embodiments, third parties 130 specify one or more sets of content items for presentation to users of the online system 140 in conjunction with messaging threads with the respective third party. For example, sets of content items include a plurality of images, videos, or web pages. In some examples, sets of content items include a specified order of images, videos, or web pages. In some embodiments, the content include targeting criteria specified by the third parties 130. Targeting criteria specify one or more characteristics of users eligible to be presented with the content item. For example, targeting criteria are used to identify users having user profile information, edges, or actions satisfying at least one of the targeting criteria. Hence, targeting criteria allow the third parties 130 to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including web page viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The request receipt module 230 receives requests from users of the online system 140 to initiate messaging threads with third parties 130. The request may be initiated by users of the online system 140 from pages associated with third parties 130, content items associated with third parties presented in content feed interfaces, sponsored content items by third parties, messaging interfaces with third parties, external links or pages associated with the online system, and other similar sources. The request receipt module 230 identifies, for each received request, a user of the online system 140 and a third party 130. The request receipt module 230 transmits the identified information to the content selection module 235 and the messaging interface module 240 to initiate the requested messaging thread.

The content selection module 235 selects content items for display to users of the online system 140 in a content feed or other content interface. Responsive to a request from a client device 110 for content items to display to a viewing user, the content selection module 235 accesses the content store 210 and information describing the viewing user from the user profile store 205. The content selection module 235 performs one or more selection processes to select one or more content items. For example, the content selection module 235 uses a machine learning model or another algorithm to select one or more content items based on a likelihood of interaction by the viewing user. The one or more content items includes at least a content item including a link to initiate a messaging thread with a third party 130. The content item may be an advertisement, sponsored content, or other content. Responsive to the content item including a link to initiate a messaging thread, the content selection module 235 accesses supplemental content specified by the third party 130 for inclusion in the messaging thread. The content selection module 235 provides the selected content items and associated supplemental content to the client device 110.

In some embodiments, the content selection module 235 additionally accesses content items specified by third parties 130 for display in conjunction with messaging threads with the respective third party responsive to receiving a request from a user of the online system 140 and selects one or more of the content items for the user. In an embodiment, the content selection module 235 selects a set of content items for a user of the online system 140 based at least in part on targeting criteria associated with the content items specified for display and on characteristics of the user of the online system. For example, the content selection module 235 identifies an age of the user of the online system 140 and selects one or more content items associated with an age range including the identified age for display in conjunction with the messaging thread. In another embodiment, the content selection module 235 uses a machine learning model to select a set of content items for display in conjunction with the messaging thread. For example, the machine learning model is trained to score one or more content items specified by third parties 130 for display based on a likelihood of interaction by users of the online system 140.

The messaging interface module 240 generates messaging interfaces for users of the online system 130. The messaging interface module 240 receives from the request receipt module 230 information identifying a user of an online system 140 and a third party 130 for a messaging thread. The messaging interface module 240 further receives from the content selection module 235 a set of content items to be displayed in conjunction with the messaging thread. In an embodiment, the messaging interface module 240 further receives information describing previous messages exchanged between the user of the online system 140 and the third party 130. Based on the received request information and set of content items, the messaging interface module 240 generates a messaging interface. As described further in conjunction with FIGS. 3A-3C, the messaging interface includes a first section displaying a content item of the set of content items and a second portion including a chat window enabling the user of the online system 140 to message the third party 130. The messaging interface module 240 transmits the generated messaging interface to a client device 110 of the user for display.

The message support module 245 enables users and third parties 130 of the online system 140 to exchange messages based on the supplemental content items via the messaging interface. Responsive to interaction by the user of the online system 140 with at least one content item of the set of content items displayed in conjunction with the messaging thread, the message support module 245 records the interaction. In some embodiments, the message support module 245 provides or updates suggested messages based at least in part on interactions with the set of content items. For example, responsive to the user completing a video content item displayed in conjunction with the messaging thread, the message support module 245 suggests a message identifying an object shown in the video content item.

In some embodiments, the message support module 245 provides an interface element for users of the messaging interface to opt in to sharing information with third parties 130 about interactions by the user with content items or accesses information about users of the messaging interface to identify a previous opt-in. Responsive to the user opting in or having previously opted in to sharing information, the message support module 245 transmits information describing interactions by the user with the supplemental content items to the third party 130 of the messaging thread. The transmitted information may be used by the third party 130 to provide further information to the user or to provide customized content to the user. For example, the message support module 245 transmits information describing a user viewing a product web page within the messaging interface to the third party 130. Based on the viewed web page, the third party 130 provides additional web page content items that may be relevant or interesting to the viewing user.

The web server 250 links the online system 140 via the network 120 to the one or more client devices 110, as well as to the one or more third party systems 130. The web server 250 serves web pages, as well as other content, such as JAVA®, FLASH®, XML, and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Displaying Supplemental Content Items in Messaging Interfaces

Figure 3A:
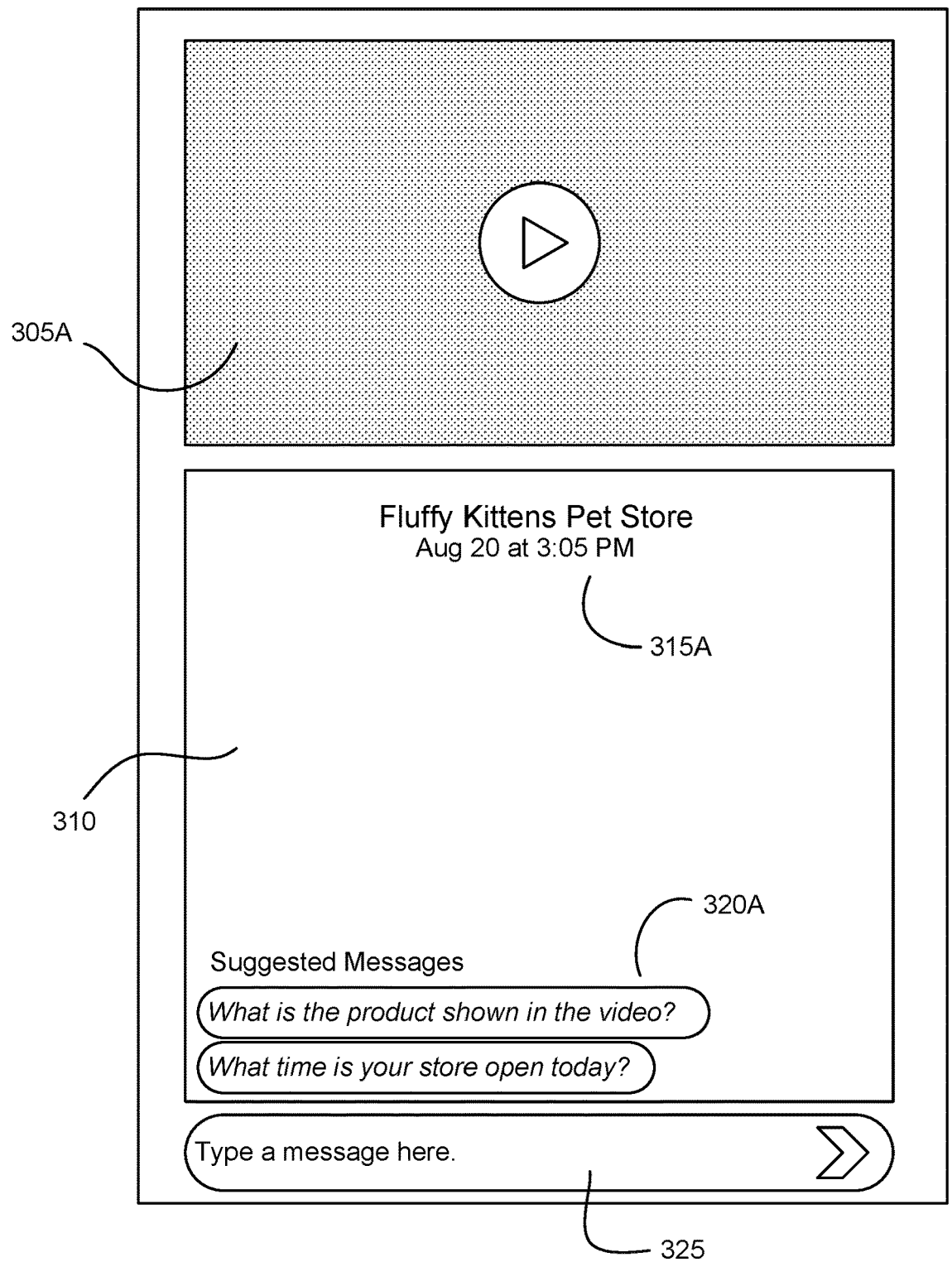
FIGS. 3A-3C are example messaging interfaces incorporating supplemental content items, in accordance with an embodiment.
Figure 3B:
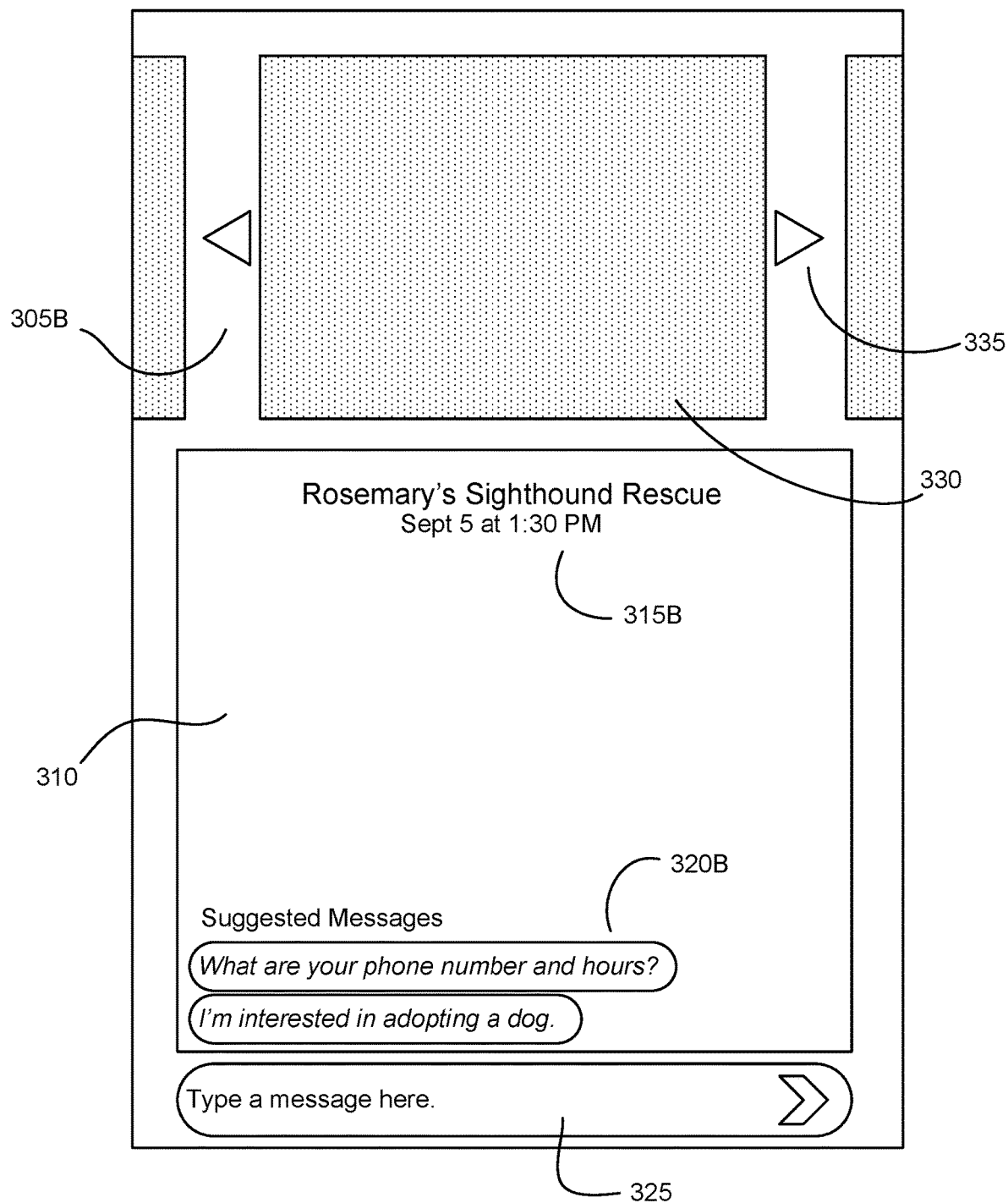
Figure 3C:
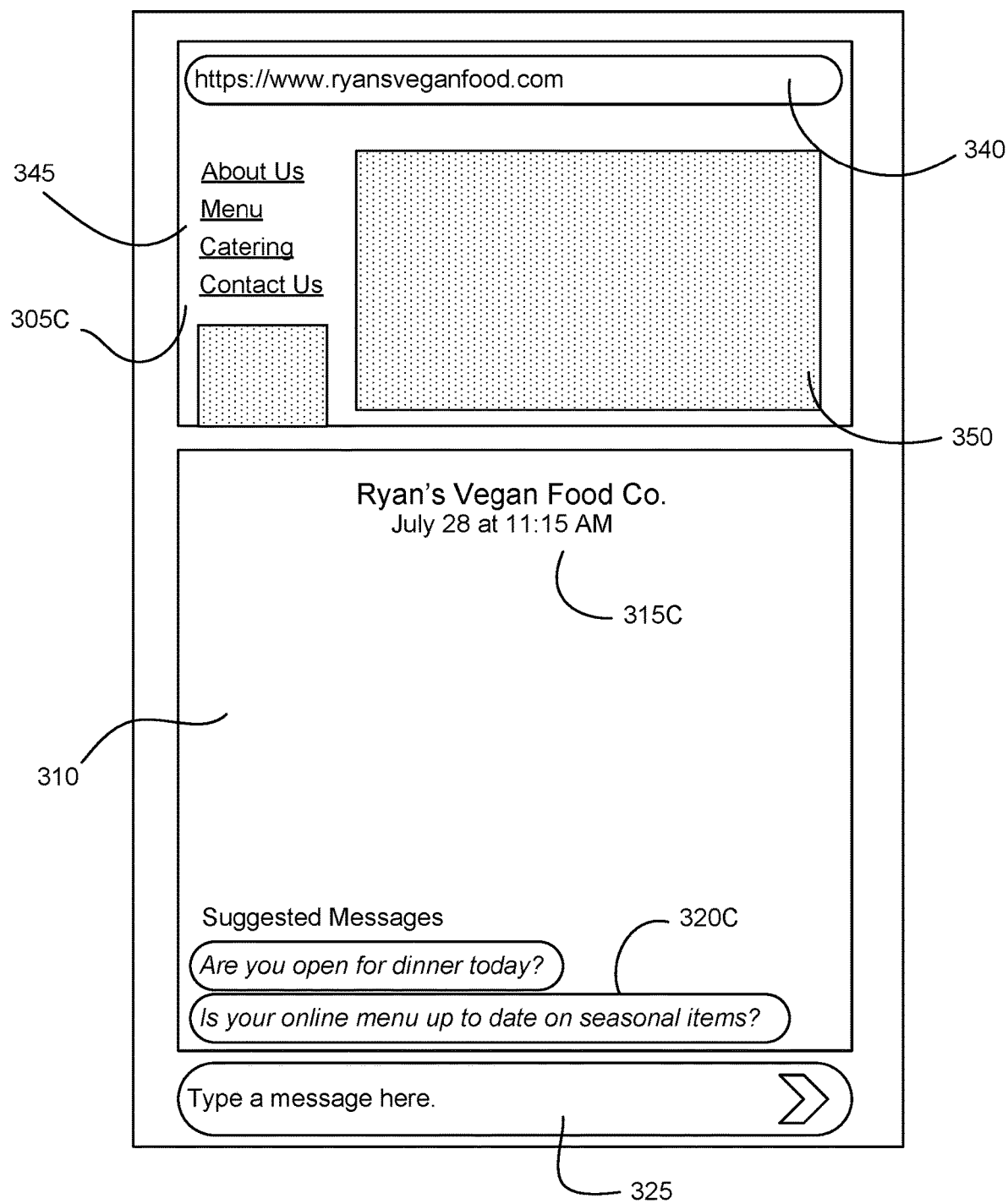

FIGS. 3A-3C are example messaging interfaces incorporating supplemental content items. FIG. 3A is an example messaging interface 300A incorporating a video content item 305A as supplemental content. The messaging interface 300A includes a first section displaying a video content item 305A and a second section including a chat window 310. A viewing user of the messaging interface 300A is able to interact with the video content item 305A without leaving the messaging interface and while viewing the chat window 310. Additionally, the online system 140 is able to easily track interactions by the viewing user with the video content item 305A. The chat window 310 includes a header 315A identifying the third party 130 ("Fluffy Kittens Pet Store") and a date and time of the messaging thread ("Aug 20 at 3:05 PM"). The chat window 310 additionally includes one or more suggested messages 320A and a text field 325 enabling the viewing user to message the third party 130. In other embodiments, the chat window 310 may include different, additional, or fewer elements than shown in FIG. 3A.

In some embodiments, the suggested messages 320A are determined at least in part based on the video content item 305A ("What is the product shown in the video?"). In some embodiments, as discussed in conjunction with FIG. 2, the suggested messages 320A are based at least in part on interactions performed by the user of the client device 110 on the video content item 305A, or are updated based at least in part on interactions with the video content item. For example, a suggested message 320A is updated responsive to the user of the client device 110 watching the video content item 305A or watching to a specified timestamp of the video content item. In another example, a suggested message 320A is updated responsive to the user of the client device 110 pausing or rewinding the video content item 305A.

In some embodiments, the online system 140 determines suggested messages 320A for display to a viewing user of a client device 110 based on one or more templates for suggested messages. For example, the third party 130 provides the one or more templates in conjunction with each supplemental content item (e.g., for each webpage, for each image, for each video or for viewed timestamps of videos, etc.). In another example, the online system 140 generates and maintains one or more generic templates for suggested messages, wherein parts or aspects of the message are determined based on metadata about the supplemental content items. For example, the online system 140 selects a generic template "How much does _____ cost?" and accesses metadata about a supplemental web page to generate a suggested message "How much does Fluffy Kittens cat food cost?" responsive to identifying the web page as a product page for Fluffy Kittens cat food. In another embodiment, the online system 140 determines suggested messages 320A for display to the viewing user based on frequently asked questions for the third party 130 from other users (e.g., asked on a page of the third party, provided by the third party as frequently asked, etc.) or based on frequently asked questions for similar third party entities.

In some embodiments, the online system 140 selects suggested messages 320A for display to a viewing user of a client device 110 based on a rules system. The third party 130 and/or the online system 140 provides rules describing one or more conditions for suggesting a message to a viewing user. For example, the third party 130 provides a rule to display a suggested message 320A "Do you have any sales right now?" for a time period associated with an ongoing sale or responsive to a viewing user accessing a product web page associated with an ongoing sale. In another example, the online system 140 provides a rule to display a suggested message 320A "How much longer will your store be open today?" responsive to a current time of the client device 110 being within opening hours of the third party 130. FIG. 3B is an example messaging interface 300B incorporating a set of image content items 305B as supplemental content. The messaging interface 300B includes a first section displaying the set of image content items 305A and a second section including a chat window 310. As shown, a first image content item 330 of the set of image content items 305A is displayed in the first section of the messaging interface 300B. In the case that the set of image content items 305A includes a plurality of image content items, the first section of the messaging interface 300B further includes elements 335, such as arrows, alongside the first image content item 330 that may be selected by the viewing user to navigate to other image content items of the set of image content items.

As discussed in conjunction with FIG. 3A, the chat window 310 includes a header 315B identifying the third party 130 ("Rosemary's Sighthound Rescue") and a date and time of the messaging thread ("Sept 5 at 1:30 PM"). The chat window 310 additionally includes one or more suggested messages 320B and a text field 325 enabling the viewing user to message the third party 130. In some embodiments, the suggested messages 320B are based at least in part on the set of image content items 305B or on interactions by the user of the client device 110 with the set of image content items. For example, the suggested messages 320B are based on the image content item 335 displayed in the messaging interface 300B and are updated as the user of the client device 110 navigates through other image content items of the set of image content items 305B.

FIG. 3C is an example messaging interface 300C incorporating a web page 305C as supplemental content. The messaging interface 300C includes a first section displaying a web page 305C and a second section including a chat window 310. A viewing user of the messaging interface 300C can navigate and interact with the web page 305C without leaving the messaging interface and while viewing the chat window 310. As shown in FIG. 3C, the web page content item 305C includes an address bar 340 identifying a URL of the web page ("https://www.ryansveganfood.com") and one or more content items and elements of the web page. For example, the web page includes one or more links 345 to other web pages ("About Us," "Menu," "Catering," "Contact Us," etc.) and one or more image or video content items 350. The user of the client device 110 may interact with the content items and elements of the web page content item 305C to navigate to other web pages or perform other actions on the web page within the messaging interface 300C.

As discussed in conjunction with FIG. 3A, the chat window 310 includes a header 315C identifying the third party 130 ("Ryan's Vegan Food Co.") and a date and time of the messaging thread ("July 28 at 11:15 AM"). The chat window 310 additionally includes one or more suggested messages 320C and a text field 325 enabling the viewing user to message the third party 130. As shown, the suggested messages 320C may be based at least in part on the web page content item 305C ("Is your online menu up to date on seasonal items?"). In some embodiments, the suggested messages 320C are updated as the user of the client device 110 navigates through the web page content item 305C. For example, responsive to the user navigating to the "Catering" web page linked within the web page content item 305C, the online system 140 accesses metadata describing the "Catering" web page to determine a subject matter (catering food) and other information about the web page. Based on the determined information, the online system 140 updates the suggested messages 320C to include a suggested message based on the "Catering" web page (e.g., "Can I get a quote for catering a party?").

Figure 4A:
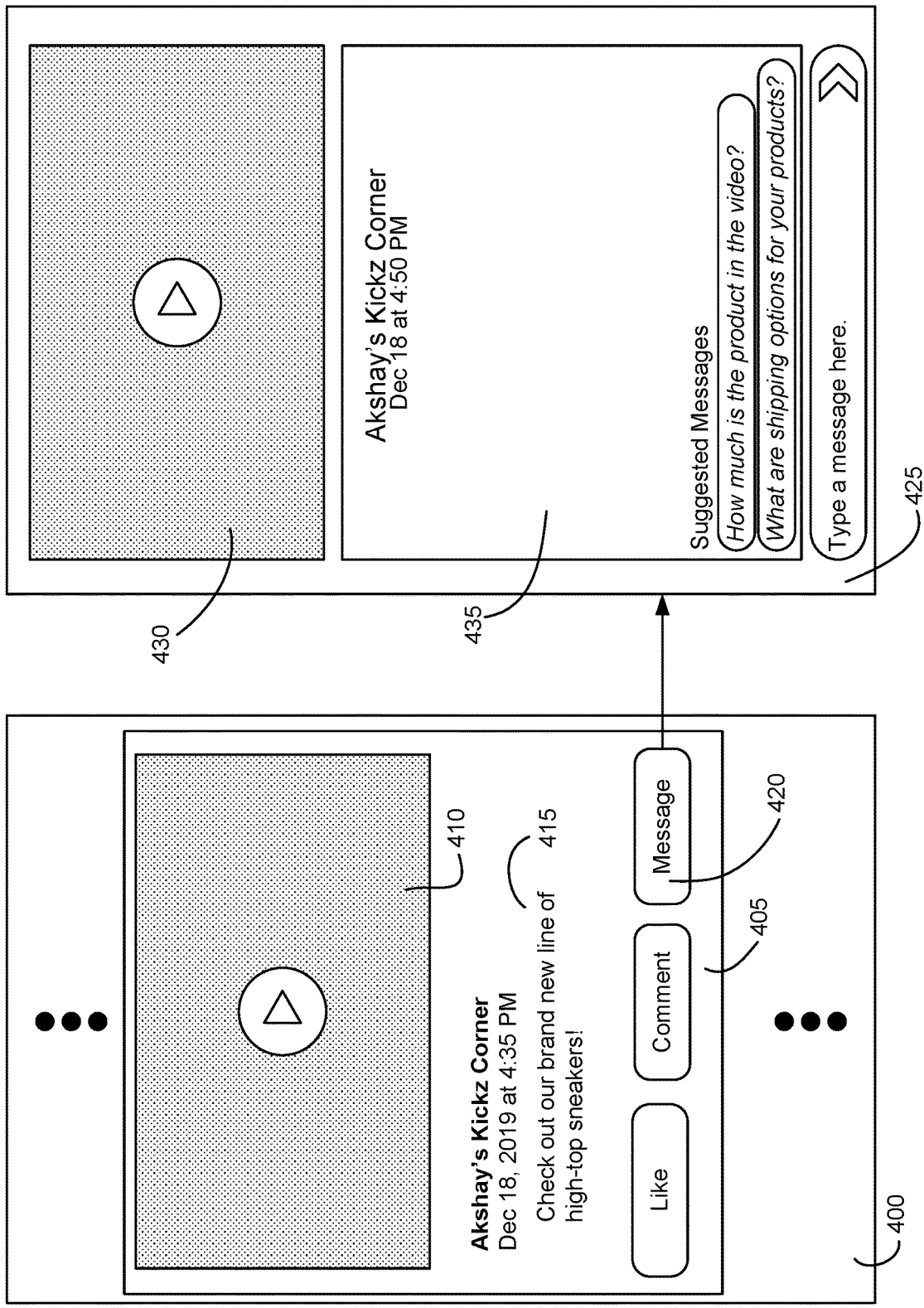
FIGS. 4A-4B are example interfaces initiating messaging interfaces incorporating supplemental content items, in accordance with an embodiment.
Figure 4B:
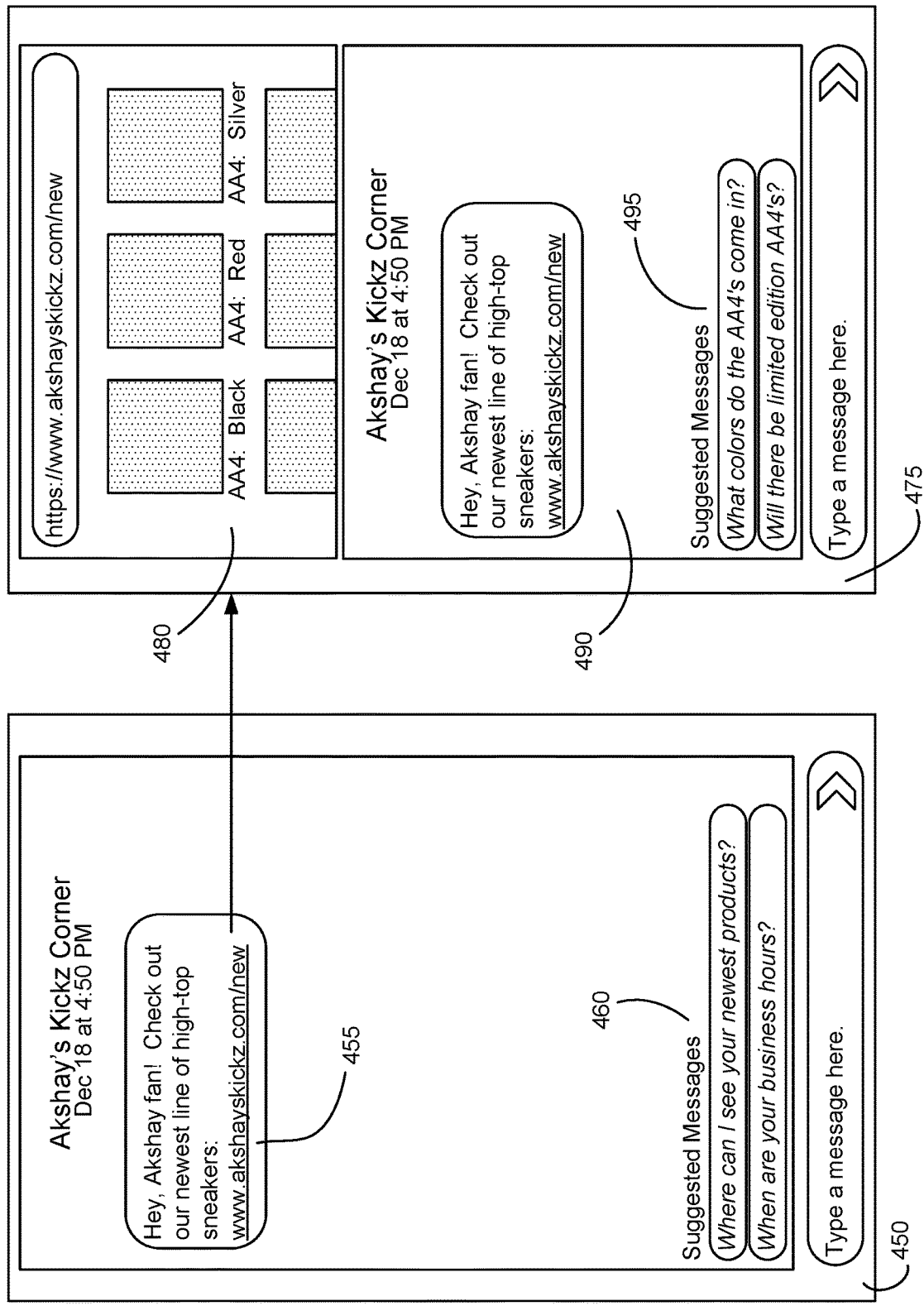

FIGS. 4A-4B are example interfaces initiating messaging interfaces incorporating supplemental content items. FIG. 4A illustrates example interfaces for initiating a messaging interface incorporating supplemental content items from a content feed 400. A user of a client device 110 accesses a content feed 400 provided by the online system 140 and views a content item 405 within the content feed. In one embodiment, the content item 405 is sponsored by a third party 130. The content item 405 includes, for example, a video or image element 410, a text element 415, and one or more elements to interact with the content item or with a third party 130 associated with the content item. The one or more elements to interact with the content item or with the third party 130 is an element 420 to message the third party associated with the content item. Responsive to the user of the client device 110 selecting the element 420 to message the third party 130, the online system 140 initiates a messaging interface 425 between the user of the client device and the third party. As described in conjunction with FIG. 3A, the messaging interface 425 includes a first section displaying a supplemental content item 430 and a second section including a chat window 435. In some embodiments, the supplemental content item 430 is the same as the video or image element 410 of the content item 405 in the content feed 400. In other embodiments, the supplemental content item 430 is different.

FIG. 4B illustrates example interfaces for initiating a messaging interface incorporating supplemental content items from a messaging thread. A user of a client device 110 initiates a messaging thread 450 with a third party 130 of the online system 140. The messaging thread 450 includes a chat window. In one embodiment, the messaging thread 450 additionally includes a header identifying the third party 130, a date and time of the messaging thread, and one or more suggested messages 460. The third party 130 transmits a message 455 including a link to a content item. In the example of FIG. 4B, the content item is a web page ("www.akshayskickz.com/new"). In other examples, the content item may be an image or video content item hosted on the online system 140. In some embodiments, the third party 130 specifies the message 455 to be automatically sent to messaging threads initiated by users of the online system 140. In other embodiments, the third party 130 sends the message 455 at a later time during a messaging thread with a user of the online system 140.

Responsive to the message 455 being transmitted, the online system 140 initiates the messaging interface 475 between the user of the client device 110 and the third party 130, the messaging interface including a first section displaying the linked supplemental content item 480 and a second section including the chat window 490. In the example of FIG. 4B, the supplemental content item 480 is a web page associated with the URL specified by the message 455 sent by the third party 130. The chat window 490 includes the previously sent message or messages exchanged between the third party 130 and the user of the client device 110. Responsive to the messaging interface 475 being updated to include the supplemental content item 480 or responsive to the user of the client device 110 interacting with the supplemental content item, the suggested messages 495 may be updated based at least in part on the displayed content item. As in the example of FIG. 4B, the online system 140 accesses and selects one or more templates for suggested messages and updates the suggested messages 495 to incorporate content based on the web page 480 ("What colors do the AA4's come in?" "Will there be limited edition AA4's?") to promote an interaction by the user of the client device 110 with the third party 130 based on the supplemental content.

Figure 5:
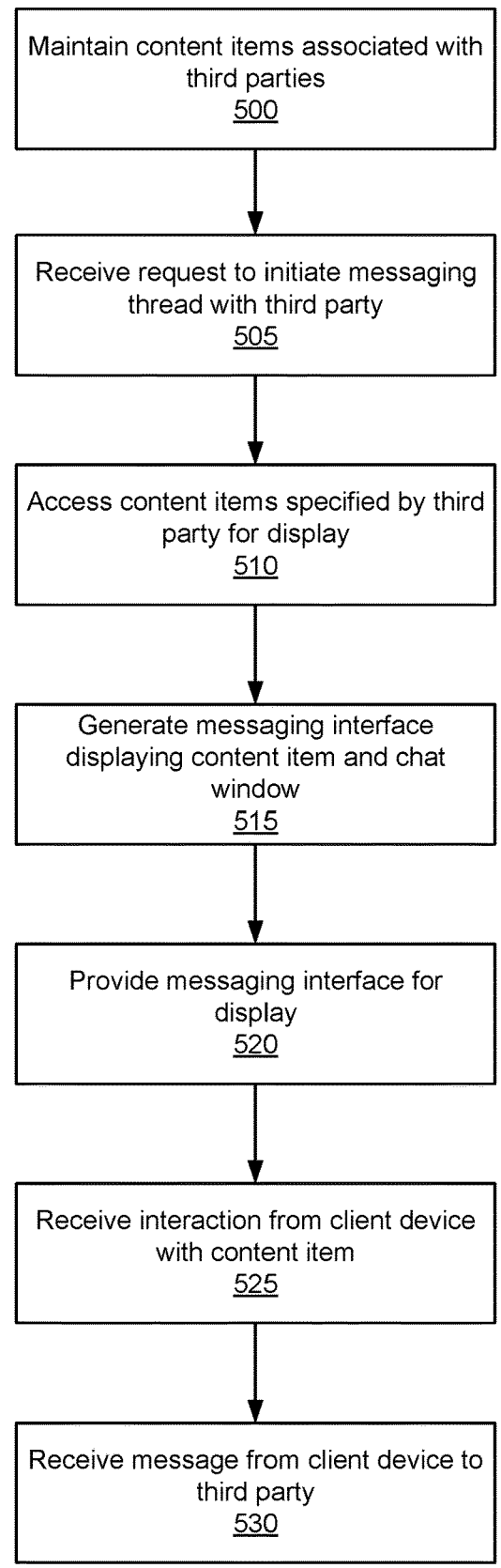
FIG. 5 is an example process for displaying supplemental content items in messaging interfaces, in accordance with an embodiment.

FIG. 5 is an example process for displaying supplemental content items in messaging interfaces. The steps of FIG. 5 may be performed by the online system 140, though in other embodiments, some or all of the steps may be performed by other entities or systems. In addition, other embodiments may include different, additional, or fewer steps, and the steps may be performed in different orders.

The online system 140 maintains 500 a plurality of content items associated with one or more third parties. The content items may be images, videos, web pages, text, URLs, or other suitable data presented to a user. The online system 140 receives 505, from a client device 110, a request to initiate a messaging thread with a third party 130. The online system 140 accesses 510 a set of content items specified by the third party 130 for display from the plurality of content items. In some embodiments, the online system 140 selects a subset of content items based on the requesting user. The online system 140 generates 515 a messaging interface and provides 520 the messaging interface to the client device 110 for display. The messaging interface comprises a first section displaying a content item of the set of content items and a second section including a chat window. The first section displaying the content item enables a viewing user to interact with the set of content items, as described in conjunction with FIGS. 3A-3C. The second section including the chat window enables the viewing user to exchange messages with the third party 130.

The online system 140 receives 525, from the client device 110, an interaction by the user of the client device with at least one content item of the set of content items and receives 530, from the client device, at least one message from the user of the client device to the third party 130.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    maintaining a plurality of content items associated with one or more third parties;
    receiving, from a client device, a request to initiate a messaging thread with a third party;
    accessing a web page associated with the third party for display from the plurality of content items;
    generating a messaging interface, the messaging interface comprising a first section displaying the web page and a second section including a chat window;
    providing the messaging interface to the client device for display;
    receiving, from the client device, a first interaction by a user of the client device with the first section of the messaging interface to navigate the web page;
    generating a plurality of suggested messages for the client device to send to the third party based on the first interaction by the user with the first section of the messaging interface;
    sending, for display to the user in the second section of the messaging interface, the plurality of suggested messages to send to the third party;
    receiving, from the client device, a second interaction by a user of the client device with the first section of the messaging interface to navigate the web page;
    generating a plurality of updated suggested messages for the client device to send to the third party based on the second interaction by the user with the first section of the messaging interface;
    sending, for display in the second section of the messaging interface, the plurality of updated suggested messages;
    receiving, from the client device, a selected suggested message of the plurality of updated suggested messages from the user of the client device; and
    sending the selected suggested message from the client device to the third party via the messaging thread.

2. The method of claim 1, wherein accessing a web page associated with the third party for display from the plurality of content items comprises:
    accessing information describing one or more actions performed by the user of the client device on one or more additional content items;
    determining, for each content item of the plurality of content items, based on the accessed information, a likelihood that the user of the client device will interact with the content item; and
    selecting, based at least in part on the determined likelihoods, the web page from the plurality of content items to display in the first section of the messaging interface.

3. The method of claim 2, wherein determining the likelihood that the user of the client device will interact with the content item is performed by a machine learning model.

4. The method of claim 1, further comprising:
    accessing information describing the user of the client device, the accessed information including an opt-in by the user of the client device to share information with one or more third parties;
    providing, to the third party, information a bout the first interaction by the user of the client device with the web page; and
    responsive to the provided information about the first interaction, receiving customized content from the third party for display to the user of the client device.

5. A non-transitory computer-readable storage medium storing computer program instructions executable by a processor to perform operations comprising:
    maintaining a plurality of content items associated with one or more third parties;
    receiving, from a client device, a request to initiate a messaging thread with a third party;
    accessing a web page associated with the third party for display from the plurality of content items;
    generating a messaging interface, the messaging interface comprising a first section displaying the web page and a second section including a chat window;
    providing the messaging interface to the client device for display;
    receiving, from the client device, first interaction by a user of the client device with the first section of messaging interface to navigate the web page;
    generating a plurality of suggested messages for the client device to send to the third party based on the first interaction by the user of the client device with the first section of the messaging interface;
    sending, for display in the second section of the messaging interface, the plurality of suggested messages to send to the third party;
    receiving, from the client device, a second interaction by a user of the client device with the first section of the messaging interface to navigate the web page;
    generating a plurality of updated suggested messages for the client device to send to the third party based on the second interaction by the user with the first section of the messaging interface;
    sending, for display in the second section of the messaging interface, the plurality of updated suggested messages;
    receiving, from the client device, a selected suggested message of the plurality of updated suggested messages from the user of the client device; and
    sending the selected suggested message from the client device to the third party via the messaging thread.

6. The computer-readable storage medium of claim 5, wherein accessing a web page associated with the third party for display from the plurality of content items comprises:
  accessing information describing one or more actions performed by the user of the client device on one or more additional content items;
  determining, for each content item of the plurality of content items, based on the accessed information, a likelihood that the user of the client device will interact with the content item; and
  selecting, based at least in part on the determined likelihoods, the web page from the plurality of content items to display in the first section of the messaging interface.

7. The computer-readable storage medium of claim 6, wherein determining the likelihood that the user of the client device will interact with the content item is performed by a machine learning model.

8. The computer-readable storage medium of claim 5, further comprising:
  accessing information describing the user of the client device, the accessed information including an opt-in by the user of the client device to share information with one or more third parties;
  providing, to the third party, information a bout the first interaction by the user of the client device with the web page; and
  responsive to the provided information about the first interaction, receiving customized content from the third party for display to the user of the client device.

* * * * *